US012724169B2

(12) United States Patent
Ikeda et al.

(10) Patent No.: US 12,724,169 B2
(45) Date of Patent: Sep. 1, 2026

(54) X-RAY INSPECTION DEVICE

(71) Applicant: ISHIDA CO., LTD., Kyoto (JP)

(72) Inventors: Shinya Ikeda, Ritto (JP); Kazuyuki Sugimoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 113 days.

(21) Appl. No.: 18/963,231

(22) Filed: Nov. 27, 2024

(65) Prior Publication Data

US 2025/0180773 A1 Jun. 5, 2025

(30) Foreign Application Priority Data

Dec. 1, 2023 (JP) ................................ 2023-204253

(51) Int. Cl.
*G01V 5/22* (2024.01)
*G01N 23/04* (2018.01)

(52) U.S. Cl.
CPC .............. *G01V 5/22* (2024.01); *G01N 23/04* (2013.01)

(58) Field of Classification Search
CPC ................................ G01N 23/04; G01V 5/22
See application file for complete search history.

(56) References Cited

U.S. PATENT DOCUMENTS

2009/0154643 A1* 6/2009 Watanabe ........... G01N 23/083 378/53
2010/0002835 A1* 1/2010 Kabumoto ............ G01N 23/04 378/207
2010/0135459 A1* 6/2010 Kabumoto ............ G01N 23/04 378/207
2010/0150308 A1* 6/2010 Tsuno ................... G01G 11/00 378/57
2010/0310043 A1* 12/2010 Shimada ............. G01N 23/083 378/57
2014/0294151 A1* 10/2014 Suyama ................ G01V 5/224 378/62
2017/0227477 A1* 8/2017 Sugimoto ............. G01N 23/18

(Continued)

FOREIGN PATENT DOCUMENTS

EP 3805742 4/2021
JP 2021-148672 A 9/2021

(Continued)

OTHER PUBLICATIONS

Extended Search Report in the corresponding European Patent Application No. 24215801.2 dated Apr. 11, 2025.

*Primary Examiner* — Blake C Riddick
(74) *Attorney, Agent, or Firm* — Spencer Fane LLP

(57) ABSTRACT

An X-ray inspection device includes a conveying unit, an X-ray irradiation unit, an X-ray detection unit, and a control unit configured to inspect whether foreign matter is included in an article based on an X-ray transmission image. The control unit performs a first inspection of using a predetermined threshold value to inspect whether the foreign matter having a lower attenuation rate of X-rays than the article is included in the article, performs a second inspection of using a machine learning algorithm to inspect whether the foreign matter is included inside the article, and determines that the foreign matter is included in the article in a case where the foreign matter common to inspection results of the first inspection and the second inspection is included in the article.

5 Claims, 5 Drawing Sheets

(56) References Cited

U.S. PATENT DOCUMENTS

| | | | | |
|---|---|---|---|---|
| 2018/0242440 | A1* | 8/2018 | Kabumoto | G01N 23/043 |
| 2019/0145913 | A1* | 5/2019 | Fukuda | G01N 23/04 378/58 |
| 2019/0212280 | A1* | 7/2019 | Sugimoto | G01N 23/04 |
| 2019/0212464 | A1* | 7/2019 | Ikeda | G01N 23/18 |
| 2019/0257773 | A1* | 8/2019 | Murray | G01N 33/12 |
| 2020/0041423 | A1* | 2/2020 | Sugimoto | G01N 23/04 |
| 2020/0302590 | A1* | 9/2020 | Sugimoto | G01N 23/04 |
| 2021/0004951 | A1* | 1/2021 | Iwai | G06T 7/90 |
| 2021/0004994 | A1* | 1/2021 | Kubo | G01N 23/04 |
| 2021/0063323 | A1* | 3/2021 | Nakatani | G06T 7/0008 |
| 2021/0121922 | A1* | 4/2021 | Schmidt | G01N 21/8851 |
| 2022/0365003 | A1* | 11/2022 | Hatano | G06T 7/0004 |
| 2022/0381706 | A1* | 12/2022 | Tsuji | G01N 23/04 |
| 2023/0122223 | A1* | 4/2023 | Takata | G06T 7/0008 382/110 |
| 2023/0243764 | A1 | 8/2023 | Iwakawa et al. | |
| 2023/0252620 | A1* | 8/2023 | Tsunoda | G06T 7/0008 702/81 |
| 2023/0252621 | A1* | 8/2023 | Tsunoda | G06T 7/0004 382/110 |
| 2023/0288349 | A1* | 9/2023 | Tsuchiya | G01N 23/083 |
| 2024/0377340 | A1* | 11/2024 | Green | G01N 23/083 |
| 2025/0003892 | A1* | 1/2025 | Yamazaki | G01N 23/04 |
| 2025/0093283 | A1* | 3/2025 | Ohashi | G01N 23/04 |
| 2025/0116616 | A1* | 4/2025 | Kanai | G01N 23/04 |

FOREIGN PATENT DOCUMENTS

| | | | | |
|---|---|---|---|---|
| WO | 2006/001107 | A1 | 1/2006 | |
| WO | WO-2019159440 | A1 * | 8/2019 | G06N 3/0499 |

* cited by examiner

X-RAY INSPECTION DEVICE

CROSS REFERENCE TO RELATED APPLICATIONS

This application claims the benefit of priority to Japanese Patent Application Number 2023-204253 filed on Dec. 1, 2023. The entire contents of the above-identified application are hereby incorporated by reference.

TECHNICAL FIELD

The disclosure relates to an X-ray inspection device.

BACKGROUND

An X-ray inspection device includes a conveying unit that conveys an article, an X-ray irradiation unit that irradiates the article conveyed by the conveying unit with X-rays, an X-ray detection unit that detects the X-rays transmitted through the article, and an inspection unit that generates an X-ray transmission image from the X-rays detected by the X-ray detection unit and inspects the article based on the X-ray transmission image (see, for example, WO 2006/001107).

SUMMARY

There is demand for an inspection that determines that foreign matter such as resin included in an article is abnormal by means of an X-ray inspection device. When using a machine learning algorithm (learned model) to perform an inspection of the foreign matter, the X-ray inspection device has difficulty distinguishing between a cavity (void) formed inside the article and the foreign matter. Thus, a cavity that is not abnormal may be determined as being abnormal, and a non-defective article may be erroneously detected as a defective article. When performing an inspection of the foreign matter through image processing (energy analysis), the X-ray inspection device may determine noise or the like to be the foreign matter when attempting to increase sensitivity, and a non-defective article may be erroneously detected as a defective article.

An aspect of the disclosure is to provide an X-ray inspection device that can reduce erroneous detection of foreign matter.

(1) An X-ray inspection device according to one aspect of the disclosure includes a conveying unit configured to convey an article, an X-ray irradiation unit configured to irradiate the article conveyed by the conveying unit with X-rays, an X-ray detection unit configured to detect the X-rays with which the X-ray irradiation unit irradiates the article and which transmit through the article, an X-ray transmission image generation unit configured to generate an X-ray transmission image based on the X-ray detected by the X-ray detection unit, and an inspection unit configured to inspect whether foreign matter is included in the article based on the X-ray transmission image generated by the X-ray transmission image generation unit. The inspection unit uses a predetermined threshold value to perform a first inspection of inspecting whether the foreign matter having a lower attenuation rate of the X-rays than the article is included in the article, uses a machine learning algorithm to perform a second inspection of inspecting whether the foreign matter is included inside the article, and determines that the foreign matter is included in the article in a case where the foreign matter common to inspection results of the first inspection and the second inspection is included in the article.

In the X-ray inspection device according to the one aspect of the disclosure, the inspection unit determines that the foreign matter is included in the article in a case where the foreign matter common to the inspection results of the first inspection and the second inspection is included in the article. Thus, by using the two inspection results, the X-ray inspection device does not determine that the foreign matter is included upon, for example, determining a cavity to be the foreign matter in the second inspection but determining that the foreign matter is not included in the article in the first inspection. Thus, the X-ray inspection device can reduce erroneous detection of the foreign matter.

(2) In the X-ray inspection device according to (1), the inspection unit may determine whether the foreign matter is included in the article based on a region occupied by the foreign matter in the X-ray transmission image upon determining that the foreign matter is included in the article in the inspection result of at least one of the first inspection and the second inspection. An attempt to increase sensitivity in the first inspection may increase the influence of minute noise, causing erroneous detection. Thus, the inspection unit determines whether the foreign matter is included in the article based on the region occupied by the foreign matter in the X-ray transmission image. This allows the X-ray inspection device to eliminate minute noise. Thus, the X-ray inspection device can reduce erroneous detection while improving detection accuracy.

(3) In the X-ray inspection device according to (1) or (2), the X-ray detection unit may detect the X-rays in a first energy band transmitted through the article and the X-rays in a second energy band transmitted through the article, the X-ray transmission image generation unit may generate the X-ray transmission image based on the X-rays in the first energy band and the X-ray transmission image based on the X-rays in the second energy band, and the inspection unit may determine whether the foreign matter is included in the article based on a difference image of a plurality of the X-ray transmission images generated by the X-ray transmission image generation unit. This configuration uses the difference image of the plurality of the X-ray transmission images based on the two different energy bands, and thus the foreign matter can be detected more accurately.

(4) In the X-ray inspection device according to any one of (1) to (3), the inspection unit may perform the second inspection by using a learned model that is machine-learned based on an image including the foreign matter having the lower attenuation rate of the X-rays than the article. This configuration allows the foreign matter such as resin inside the article to be accurately detected.

(5) In the X-ray inspection device according to any one of (1) to (4), the foreign matter may have a specific gravity smaller than the article. The foreign matter such as resin inside the article (object to be inspected) has the specific gravity smaller than the article. Using the above configuration enables the X-ray inspection device to accurately detect the foreign matter such as resin inside the article.

One aspect of the disclosure can reduce erroneous detection of foreign matter.

DESCRIPTION OF EMBODIMENTS

A preferred embodiment of the disclosure will be described below in detail with reference to the attached drawings. Note that, in the description of the drawings, identical or equivalent elements are denoted by the same reference signs and redundant descriptions thereof will be omitted.

Figure 1:
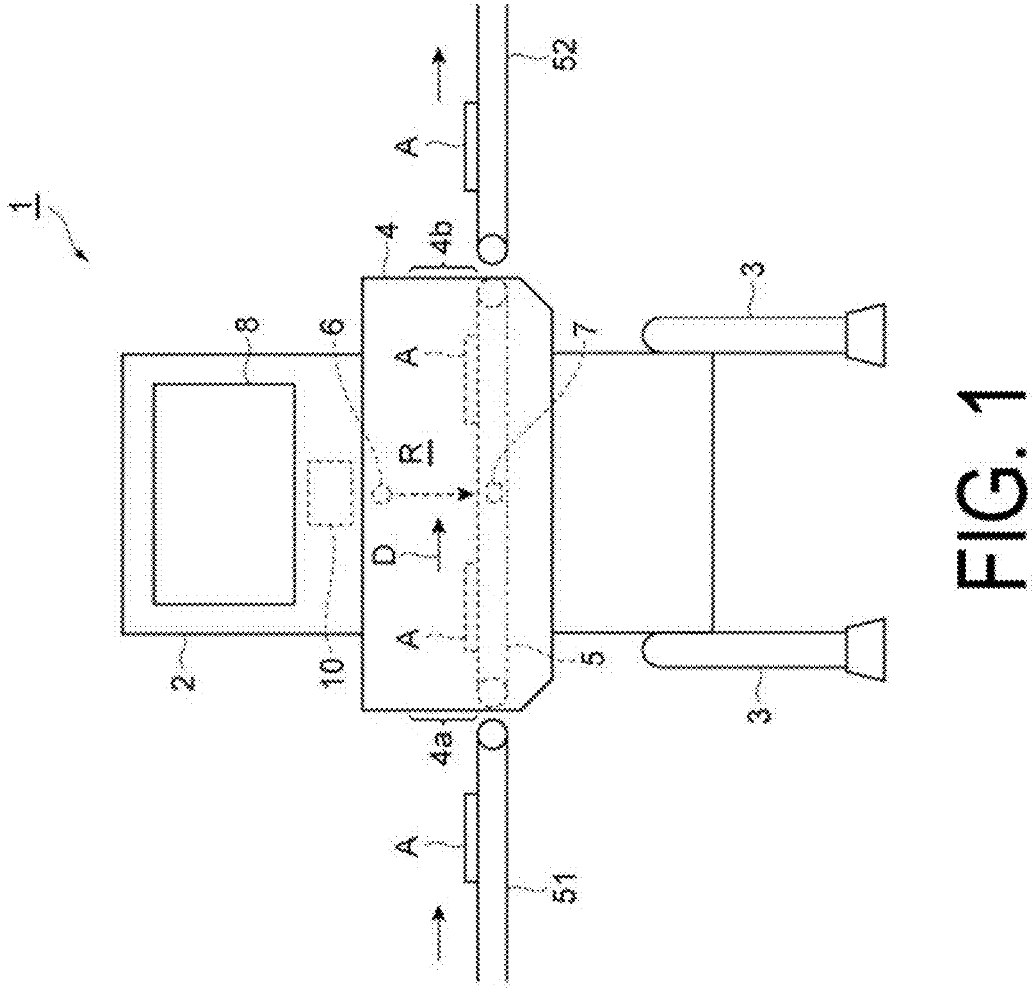
FIG. 1 is a configuration diagram illustrating an X-ray inspection device according to an embodiment.

As illustrated in FIG. 1, an X-ray inspection device 1 includes a device main body 2, support legs 3, a shield box 4, a conveying unit 5, an X-ray irradiation unit 6, an X-ray detection unit 7, a display operation unit 8, and a control unit 10. In the present embodiment, for example, the X-ray inspection device 1 inspects foreign matter inside an article A, such as soft candy. The foreign matter is, for example, resin.

The X-ray inspection device 1 generates an X-ray transmission image of the article A while conveying the article A and performs an inspection of the article A (foreign matter contamination inspection) based on the X-ray transmission image. The article A before the inspection is conveyed into the X-ray inspection device 1 by an inbound conveyor 51. The article A after the inspection is conveyed out from the X-ray inspection device 1 by an outbound conveyor 52. When the article A is determined as being a defective article by the X-ray inspection device 1, the article A is sorted out from a production line by a sorting device (not illustrated) disposed downstream of the outbound conveyor 52. When the article A is determined as being a non-defective article by the X-ray inspection device 1, the article A passes through the sorting device.

The device main body 2 accommodates the control unit 10 and other constituent elements. The support legs 3 support the device main body 2. The shield box 4 is provided on the device main body 2. The shield box 4 prevents leakage of X-rays to the outside. Inside the shield box 4, an inspection region R is provided where the article A is inspected by X-rays. A conveyance inlet 4*a* and a conveyance outlet 4*b* are formed in the shield box 4. The article A before the inspection is conveyed into the inspection region R from the inbound conveyor 51 via the conveyance inlet 4*a*. The article A after the inspection is conveyed out from the inspection region R to the outbound conveyor 52 via the conveyance outlet 4*b*. Each of the conveyance inlet 4*a* and the conveyance outlet 4*b* is provided with an X-ray shielding curtain (not illustrated) for preventing leakage of X-rays.

The conveying unit 5 is disposed in the shield box 4. The conveying unit 5 conveys the article A from the conveyance inlet 4*a* to the conveyance outlet 4*b* through the inspection region R in a conveyance direction D. The conveying unit 5 is, for example, a belt conveyor that is stretched between the conveyance inlet 4*a* and the conveyance outlet 4*b*.

Figure 2:
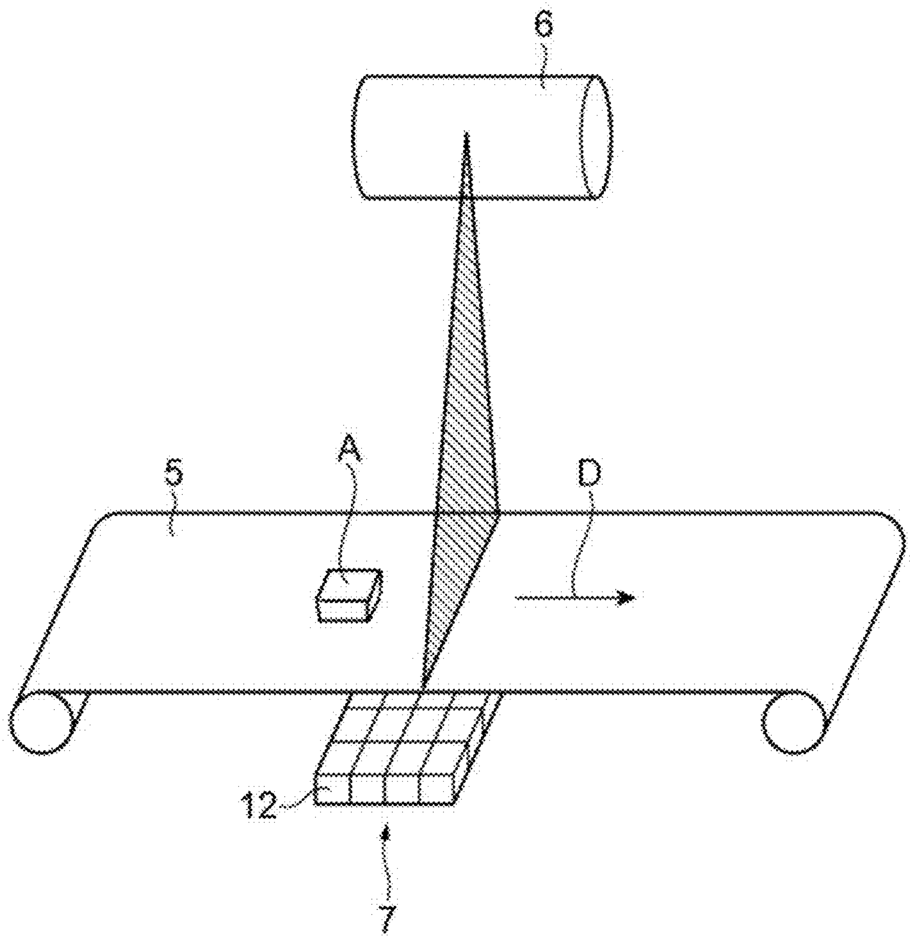
FIG. 2 is a configuration diagram illustrating an interior of a shield box illustrated in FIG. 1.

As illustrated in FIG. 1 and FIG. 2, the X-ray irradiation unit 6 is disposed in the shield box 4. The X-ray irradiation unit 6 irradiates the article A conveyed by the conveying unit 5 with X-rays. The X-ray irradiation unit 6 includes, for example, an X-ray tube that emits X-rays and a collimator that widens the X-rays emitted from the X-ray tube into a fan-like shape in a plane perpendicular to the conveyance direction D.

The X-ray detection unit 7 is a sensor 12 that detects electromagnetic waves. The X-ray detection unit 7 may be configured to detect X-rays in a specific energy band or may be configured to detect X-rays by a photon counting method. The X-ray detection unit 7 may be a direct conversion type detection unit or an indirect conversion type detection unit. In the present embodiment, the X-ray detection unit 7 is a direct conversion type detection unit that can detect X-rays by a photon counting method and includes sensors (multi-energy sensors) that detect X-rays in a plurality of energy bands transmitted through the article A. The sensors are arranged, for example, at least in a direction orthogonal to the conveyance direction of the conveying unit 5 and the up-down direction (width direction). These elements may be arranged linearly not only in the width direction described above but also in the conveyance direction described above. That is, the X-ray detection unit 7 may include a line sensor or may include a sensor group disposed two-dimensionally. The sensor 12 is, for example, a photon detection type sensor such as a CdTe semiconductor detector.

As illustrated in FIG. 1, the display operation unit 8 is provided in the device main body 2. The display operation unit 8 displays various types of information and receives input of various conditions. The display operation unit 8 is, for example, a liquid crystal display and displays an operation screen as a touch panel. In this case, an operator can input various conditions via the display operation unit 8.

The control unit 10 is disposed in the device main body 2. The control unit 10 controls the operation of each component of the X-ray inspection device 1. The control unit 10 includes a central processing unit (CPU), a read only memory (ROM), and a random access memory (RAM). Detection results of X-rays in a low-energy band (first energy band) are input to the control unit 10 from the sensor 12 (see FIG. 2) of the X-ray detection unit 7, and detection results of X-rays in a high-energy band (second energy band) are input to the control unit 10 from the sensor 12 (see FIG. 2) of the X-ray detection unit 7. The control unit 10 generates X-ray transmission images based on the detection results. The control unit 10 functions as an X-ray transmission image generation unit that generates the X-ray transmission images based on the X-rays detected by the X-ray detection unit 7. The control unit 10 also functions as an inspection unit that inspects whether foreign matter F (see FIG. 3A and the like) is included in the article A based on the X-ray transmission images.

The control unit 10 performs a first inspection and a second inspection to inspect whether the foreign matter F is included inside the article A. The control unit 10 uses a predetermined threshold value to perform the first inspection of inspecting whether the foreign matter F having an X-ray attenuation rate lower than the article A is included in the article A. The control unit 10 uses a machine learning algorithm to perform the second inspection of inspecting whether the foreign matter F is included in the article A. When the foreign matter F common to the inspection results of the first inspection and the second inspection is included in the article A, the control unit 10 determines that the foreign matter F is included in the article A. The inside of the article A is a portion on a path through which the X-rays transmit between a front surface (a surface facing upward when the article A is conveyed) and a back surface (a surface facing a conveyance surface when the article A is conveyed) of the article A.

First Inspection

First, the first inspection in the control unit 10 will be described. The detection results of the X-ray detection unit 7 are input to the control unit 10. In the present embodiment, the detection results of the X-rays in the low-energy band and the detection results of the X-rays in the high-energy band are input to the control unit 10 from the sensor 12 of the X-ray detection unit 7. The control unit 10 generates a plurality of X-ray transmission images based on the X-rays in the plurality of energy bands detected by the X-ray detection unit 7.

Figure 3A:
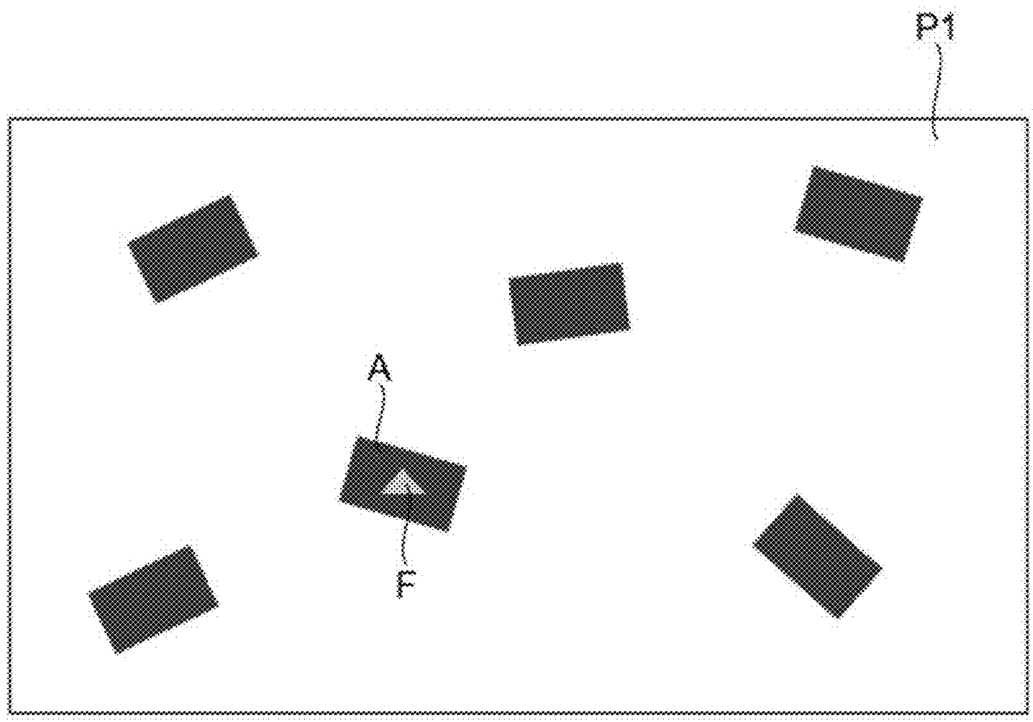
FIGS. 3A and 3B are diagrams illustrating transmission images.
Figure 3B:
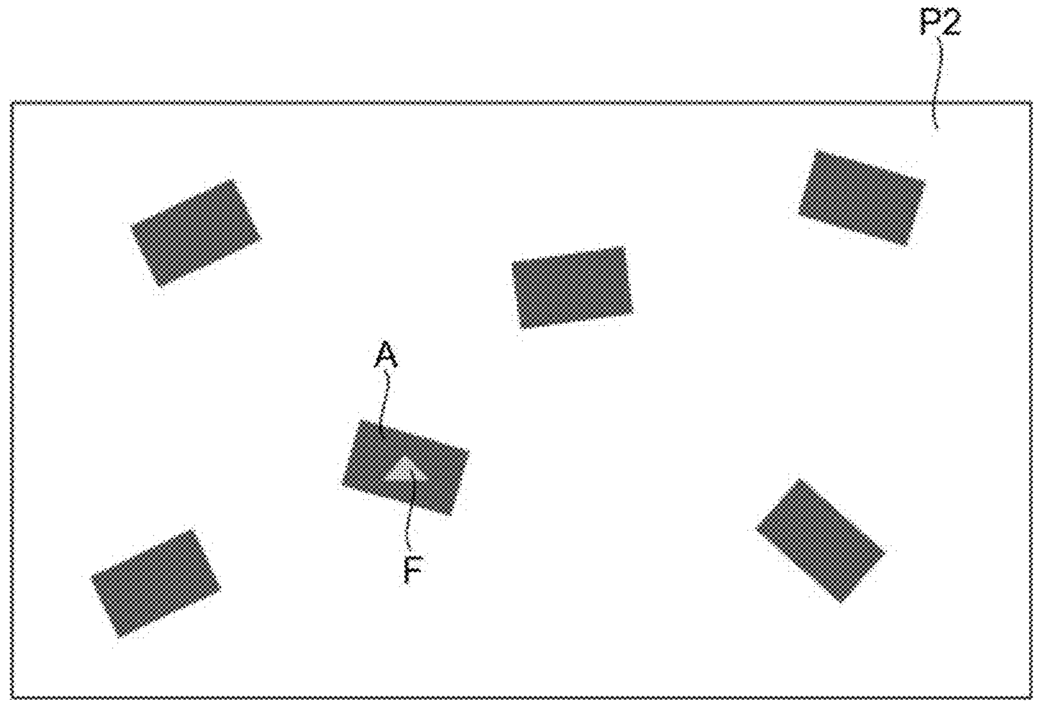

As illustrated in FIG. 3A, the control unit 10 generates a first transmission image P1 as the X-ray transmission image based on the detection results of the X-rays in the low-energy band. As illustrated in FIG. 3B, the control unit 10 generates a second transmission image P2 as the X-ray transmission image based on the detection results of the X-rays in the high-energy band. In each of the first transmission image P1 and the second transmission image P2, at least the article A and a background other than the article A are illustrated. As in the example illustrated in FIG. 3A, the first transmission image P1 is darker as a whole than the second transmission image P2. On the other hand, as in the example illustrated in FIG. 3B, the second transmission image P2 is brighter as a whole than the first transmission image P1. Comparison in brightness between the first transmission image P1 and the second transmission image P2 corresponds to comparison in brightness between the article A displayed in the first transmission image P1 and the article A displayed in the second transmission image P2.

The control unit 10 performs image processing including subtraction processing on the first transmission image P1 and the second transmission image P2 to generate a difference image in which the difference between the first transmission image P1 and the second transmission image P2 is extracted. For example, the control unit 10 matches the luminance values (gray values) of portions corresponding to the articles A of the first transmission image P1 and the second transmission image P2, performs difference processing of calculating the difference in the luminance value of each of these pixels, and acquires a difference image processed so that the differences between the luminance values of the pixels corresponding to the foreign matter F and the luminance values of the pixels not corresponding to the foreign matter F are increased. Here, the control unit 10 may use an image processing algorithm to perform image processing on at least one of the first transmission image P1 and the second transmission image P2.

The image processing algorithm is composed of one image processing filter or a combination of a plurality of image processing filters. The image processing algorithm can be acquired from the outside via a network such as the Internet. The image processing algorithm can also be acquired from an external storage medium such as a USB memory stick or a removable hard disk. The image processing algorithm adopts genetic algorithms (GA), which are techniques of applying mechanisms of inheritance and evolution in the living world and can be automatically generated from a plurality of image processing filters based on the specifications, inspection conditions, or the like of the X-ray inspection device 1. The image processing algorithm can be appropriately set by a user via the display operation unit 8.

Figure 4:
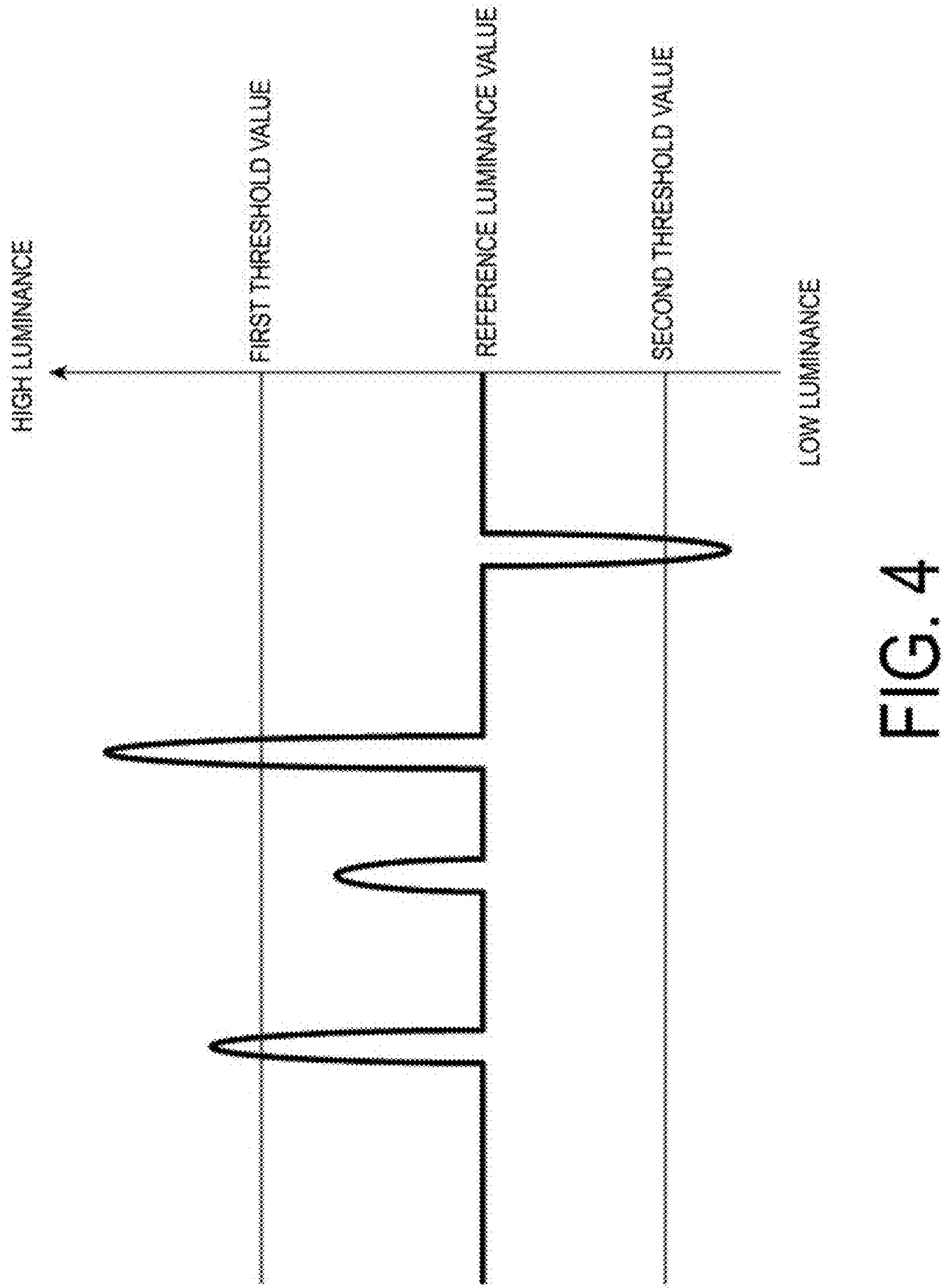
FIG. 4 is a graph schematically showing an example of a luminance distribution of a difference image.

FIG. 4 is a graph schematically showing an example of a luminance distribution of the difference image. In FIG. 4, the vertical axis represents the luminance, and the horizontal axis represents the position (each pixel of the difference image) in the conveyance direction D. The control unit 10 performs an inspection regarding the presence or absence of the foreign matter F included in the article A based on the generated difference image. The control unit 10 detects the foreign matter F based on the luminance distribution of the difference image. The control unit 10 uses a first threshold value to detect first foreign matter having a specific gravity higher (heavier) than the article A and uses a second threshold value different from the first threshold value to detect second foreign matter having a specific gravity lower (lighter) than the article A. Specifically, the control unit 10 detects the first foreign matter when there is a luminance value greater than the first threshold value in the luminance distribution of the difference image. When there is a luminance value smaller than the second threshold value in the luminance distribution of the difference image, the control unit 10 detects the second foreign matter.

As shown in FIG. 4, the first threshold value is a luminance value greater than a reference luminance value that is a luminance value corresponding to the article A. The reference luminance value is, for example, zero and also corresponds to the background of the difference image. The first threshold value is a foreign matter determination threshold value for determining the presence or absence of the first foreign matter. The second threshold value is a foreign matter determination threshold value for determining the presence or absence of the second foreign matter. The second threshold value is a luminance value smaller than the reference luminance value. The first threshold value and the second threshold value can be individually set via the display operation unit 8. The first threshold value and the second threshold value may be appropriately set through a test or the like in accordance with the properties of the article A. For example, the absolute value of the first threshold value may be greater than the absolute value of the second threshold value.

The first foreign matter is, for example, metal inside the article A, and is made of an element heavier than the element of the article A. The first foreign matter corresponds to, for example, a bright portion in the difference image. The second foreign matter is, for example, plastic resin inside the article A, and is made of an element lighter than the element of the article A. The second foreign matter corresponds to, for example, a dark portion in the difference image.

In the example shown in FIG. 4, the luminance value in the luminance distribution of the difference image becomes greater than the first threshold value (that is, there is a significantly bright portion in the difference image), and it can be determined that the first foreign matter is included therein. In addition, the luminance value in the luminance distribution of the difference image becomes smaller than the second threshold value (that is, there is a significantly dark portion in the difference image), and it can be determined that the second foreign matter is included therein. Note that, when the luminance value is equal to or smaller than the first threshold value and equal to or greater than the second threshold value (that is, when the brightness of the difference image is the same as the brightness of the background) in the luminance distribution of the difference image, it can be determined that there is no foreign matter therein.

Second Inspection

Next, the second inspection will be described. The control unit 10 uses a learned model to determine whether the foreign matter F is included in the article A. The learned model is a learned model that is machine-learned based on an image including the foreign matter F having an X-ray attenuation rate lower than the article A. The learned model can be acquired from an external storage medium such as a USB memory stick or a removable hard disk. The control unit 10 inputs, for example, the second transmission image P2, to the learned model and determines whether the foreign matter F is included in the article A. The control unit 10 stores the inspection result of the foreign matter F in the storage unit.

Foreign Matter Determination

When the foreign matter F (second foreign matter) common to the inspection result of the first inspection and the inspection result of the second inspection is included in the article A, the control unit 10 determines that the foreign matter F is included in the article A. When determining that the foreign matter F is included in the article A in the inspection result of at least one of the first inspection and the second inspection, the control unit 10 determines whether the foreign matter F is included in the article A based on a region occupied by the foreign matter F in the X-ray transmission image. The threshold value may be appropriately set through a test or the like in accordance with properties (such as a size) of the foreign matter F. In the present embodiment, when the foreign matter F common to the inspection result of the first inspection and the inspection result of the second inspection is included in the article A and the area of the foreign matter F is equal to or greater than the threshold value, the control unit 10 determines that the foreign matter F is included in the article A.

The control unit 10 displays the inspection result on the display operation unit 8 after determining the foreign matter detection. On the display operation unit 8, for example, an inspection result image and the inspection result "Good (non-defective article)" or "No good (defective article)" are displayed. On the display operation unit 8, a region including the foreign matter F is displayed in an enclosed manner. In addition, upon determining that the foreign matter F is included in the article A, the control unit 10 outputs an instruction signal for instructing the sorting device to sort out the article A.

As described above, in the X-ray inspection device 1 according to the present embodiment, the control unit 10 determines that the foreign matter F is included in the article A when the foreign matter F common to the inspection results of the first inspection and the second inspection is included in the article A. Thus, as a result of using the two inspection results, the X-ray inspection device 1 does not determine that the foreign matter F is included in the article A, for example, in a case where it is determined in the second inspection that a cavity is the foreign matter F, but it is determined in the first inspection that the foreign matter F is not included. Thus, the X-ray inspection device 1 can reduce erroneous detection of the foreign matter F.

In the X-ray inspection device 1 according to the present embodiment, the control unit 10 determines whether the foreign matter F is included in the article A based on the region occupied by the foreign matter F in the X-ray transmission image upon determining that the foreign matter F is included in the article A in the inspection result of at least one of the first inspection and the second inspection. An attempt to increase sensitivity in the first inspection increases the influence of minute noise, which may cause erroneous detection. Thus, the control unit 10 determines whether the foreign matter F is included in the article A based on the region occupied by the foreign matter F in the X-ray transmission image. This allows the X-ray inspection device 1 to eliminate minute noise. Consequently, the X-ray inspection device 1 can reduce erroneous detection while improving detection accuracy.

In the X-ray inspection device 1 according to the present embodiment, the X-ray detection unit 7 detects the X-rays in the high-energy band transmitted through the article A and the X-rays in the low-energy band transmitted through the article A. The control unit 10 generates the first transmission image P1 based on the X-rays in the high-energy band and the second transmission image P2 based on the X-rays in the low-energy band. The control unit 10 determines whether the foreign matter F is included in the article A based on the difference image of the first transmission image P1 and the second transmission image P2. In this configuration, since the difference image of the plurality of X-ray transmission images based on the two different energy bands is used, the foreign matter F can be detected more accurately.

In the X-ray inspection device 1 according to the present embodiment, the control unit 10 performs the second inspection by using the learned model that is machine-learned based on the image including the foreign matter F having the X-ray attenuation rate lower than the article A. This configuration allows the foreign matter F such as resin inside the article A to be accurately detected.

Although an embodiment of the disclosure has been described above, the disclosure is not necessarily limited to the above-described embodiment, and various modifications can be made without departing from the gist of the disclosure.

In the above-described embodiment, the X-ray detection unit 7 is configured to detect the X-rays in the two bands, but is not limited thereto. For example, the X-ray detection unit 7 may be configured to detect X-rays in three or more bands. In this case, the X-ray detection unit 7 may use the X-rays in the three or more bands to determine the presence or absence of foreign matter included in the article A.

In the embodiment described above, an example is given of a mode that is a so-called photon-counting sensor as the X-ray detection unit 7. However, the X-ray detection unit 7 may include a first line sensor and a second line sensor. Each of the first line sensor and the second line sensor is composed of X-ray detection elements (not illustrated) arrayed one-dimensionally along a horizontal direction perpendicular to the conveyance direction D. The first line sensor detects X-rays in a low-energy band transmitted through the article A and the conveying belt of the conveying unit 5. The second line sensor detects X-rays in a high-energy band transmitted through the article A, the conveying belt of the conveying unit 5, and the first line sensor. The X-ray detection unit 7 may be configured to include one line sensor or may use another sensor.

In the above-described embodiment, an example is given of a mode of generating the first transmission image P1 and the second transmission image P2, and determining whether the foreign matter F is included in the article A based on the difference image obtained by extracting the difference between the first transmission image P1 and the second transmission image P2. However, in a configuration in which X-rays in a plurality of energy bands are not detected, whether the foreign matter F is included in the article A may be determined based on an X-ray transmission image.

In the above-described embodiment, an example is given of a mode of using the learned model that is machine-learned based on the image including the foreign matter F having the X-ray attenuation rate lower than the article A in the second inspection for the purpose of inspecting the foreign matter F having the X-ray attenuation rate lower than the article A. However, the learned model is not limited thereto. For example, a learned model that is machine-learned based on an image including foreign matter F having an X-ray attenuation rate higher than the article A may be used in the second inspection. When this learned model is used, metal or the like can be detected as the foreign matter F. Specifically, when the foreign matter F (first foreign matter) common to the inspection result of the first inspection and the inspection result of the second inspection is included in the article A, it is determined that the foreign matter F is included in the article A.

In the above-described embodiment, the X-ray inspection device 1 includes the control unit 10, but no such limitation is intended. For example, at least some of the functions of the control unit 10 may be implemented in an external control device (such as a laptop PC, a tablet, or a server) capable of performing wired or wireless communication with the X-ray inspection device 1. The configurations in the embodiment or the modification described above can be optionally applied to configurations in another embodiment or another modification.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An X-ray inspection device, comprising:

a conveying unit configured to convey an article;

an X-ray irradiation unit configured to irradiate the article conveyed by the conveying unit with X-rays;

an X-ray detection unit configured to detect the X-rays with which the X-ray irradiation unit irradiates the article and which transmit through the article;

an X-ray transmission image generation unit configured to generate an X-ray transmission image based on the X-rays detected by the X-ray detection unit; and an inspection unit configured to inspect whether foreign matter is included in the article based on the X-ray transmission image generated by the X-ray transmission image generation unit, wherein the inspection unit performs a first inspection of using a predetermined threshold value to inspect whether the foreign matter having a lower attenuation rate of the X-rays than the article is included in the article, performs a second inspection of using a machine learning algorithm to inspect whether the foreign matter is included inside the article, and determines that the foreign matter is included in the article in case where the foreign matter common to inspection results of the first inspection and the second inspection is included in the article.

2. The X-ray inspection device according to claim 1, wherein the inspection unit determines whether the foreign matter is included in the article based on a region occupied by the foreign matter in the X-ray transmission image upon determining that the foreign matter is included in the article in the inspection result of at least one of the first inspection and the second inspection.

3. The X-ray inspection device according to claim 1, wherein the X-ray detection unit detects the X-rays in a first energy band transmitted through the article and the X-rays in a second energy band transmitted through the article, the X-ray transmission image generation unit generates the X-ray transmission image based on the X-rays in the first energy band and the X-ray transmission image based on the X-rays in the second energy band, and the inspection unit determines whether the foreign matter is included in the article based on a difference image of a plurality of the X-ray transmission images generated by the X-ray transmission image generation unit.

4. The X-ray inspection device according to claim 1, wherein the inspection unit performs the second inspection by using a learned model that is machine-learned based on an image including the foreign matter having the lower attenuation rate of the X-rays than the article.

5. The X-ray inspection device according to claim 1, wherein the foreign matter has a specific gravity smaller than the article.

* * * * *